Jan. 17, 1939. L. J. PAGE 2,144,165
ADJUSTABLE NOSE PAD MOUNTING FOR RAISING AND LOWERING BIFOCAL LENSES
Filed March 19, 1936

INVENTOR.
Louis John Page

Patented Jan. 17, 1939

2,144,165

UNITED STATES PATENT OFFICE 2,144,165

ADJUSTABLE NOSE PAD MOUNTING FOR RAISING AND LOWERING BIFOCAL LENSES

Louis John Page, Hollis, N. Y.

Application March 19, 1936, Serial No. 69,608

10 Claims. (Cl. 88—49)

The invention relates to improvements in adjustable bifocal mountings, in which the bridge consisting of a center substantially the same as those used in present bridges connects and supports the lenses. To the lower part of the bridge are attached arms supporting nose pads which carry the glasses on the nose. In the invention the arms supporting the pads remain stationary and the pads revolve for the adjustment of the glasses up or down.

Figure 1:
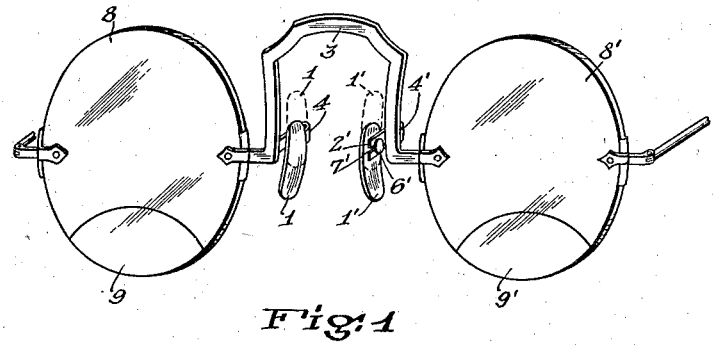

The form of the invention is illustrated in the accompanying drawing, in which Figure 1 is a front perspective view of a pair of bifocal glasses demonstrating the pads in opposite adjustments, one adjustment being shown by dotted lines.

Figure 2:
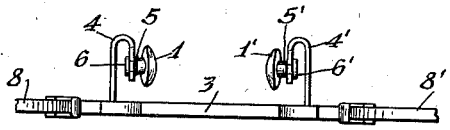

Figure 2 is a plan view of the bridge showing the arms in relation to the main structure, the arms supporting the pads.

Figure 3:
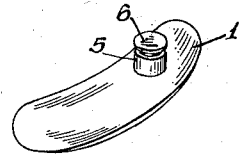

Figure 3, a perspective view, illustrates the nose pad 1 supporting a pin 5, the pin located outside the geometric center of the pad 1.

Figure 4:
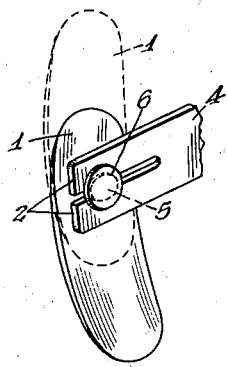

Figure 4 is a perspective view of the nose pad showing the pad supporting a pin, the pin showing its base, its bearing surface and its flanged end in relation to the arm 4.

Figure 5:
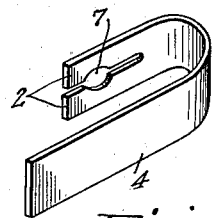

Figure 5, a perspective view of the arm, illustrates the holding or attaching device by which the pin of the pad is supported.

In Figure 1 the bridge 3 is shown supporting lenses 8 and 8' containing the segments 9 and 9' respectively, the arms 4 and 4' connected to the lower parts of the vertical members of the bridge 3. The split ends 2 and 2' of the arms 4 and 4' are resilient to the extent to expand and contract to allow for the rotation of pins 5 and 5' which are fixed to the pads 1 and 1'. The pads 1 and 1' are shown rotated to an elevated position. Should both pads be positioned as shown in full lines, the lenses would be raised for close use. Should pads be elevated to position as shown in dotted lines, they would lower the lenses in position for distant use. The pads 1 and 1' are adjusted to different positions by pressure against their thin sides at the end farthest from pins 5 and 5'. The pads are rotated in approximately the plane of their own surfaces and remain in a fixed position when their long axes are approximately vertical.

Figure 2 shows bridge 3 supporting the arms 4 and 4' in a stationary position supporting the pins 5 and 5' which in turn are fixed in the pads 1 and 1'; the pins 5 and 5' inserted in openings in the arms 4 and 4' are retained by flanges designated 6 and 6'.

In Figure 3 the pad 1 is shown supporting the pin 5 located at a point outside the geometric center of the pad 1, the pin 5 illllustrating a larger base, reduced to a bearing surface of a smaller diameter, oval in cross section, to its free end; a flange 6 is shown, which is made after the pad has been inserted into the arm 4.

Figure 4 is another illustration to show pad 1 fixed to pin 5 whose base being larger than the bearing area prevents the pad 1 from friction against the arm 4, the arm 4 retaining the pin 5. The pin 5 is constructed to have its bearing surface (that part between the base and the flange) of an elliptical or oval shape, which fits in an opening in arm 4 which is similarly shaped oval to receive the pin and retain it in a fixed position until the pad is manually rotated about the pin as an axis in which case the opening in arm 4 expands to allow for the long axis of the oval bearing surface of the pin 5 to rotate to a new position.

In Figure 5 the arm 4 is shown containing the opening 7 which receives the pin illustrating its oval opening. The arm 4 is shown split, from its free end through opening 7, into two prongs 2. This division in the arm 4 allows for the expansion and contraction of the opening 7. When the pad is rotated 90 degrees the prongs 2 are expanded to their maximum; when the pad again is rotated up or down to an approximately vertical position the prongs 2 return to their original position holding the pad to its new adjustment.

I am aware that prior to my invention eyeglass and spectacle bridges have been made to raise and lower bifocal lenses by various means, therefore I do not claim the basic idea; but I do claim—

1. In combination in a spectacle or eyeglass structure, a pair of lenses each comprising a distance portion and a reading portion; a bridge member; means for attaching said lenses to said bridge member; a nose pad; and securing means for attaching said pad to said bridge member, said securing means comprising an elastic, forked, metallic member fixed to the bridge member having a notch formed in the forked portion thereof, and a metallic shaft mounted eccentrically on said pad and rotatably mounted in said notch of said fork in a manner that the lens may be raised and lowered relative to said pad, and means on said notch for cooperating with means on said metallic shaft for releasably securing said pad in a raised or lowered position.

2. In combination in a spectacle or eyeglass structure, a pair of lenses each comprising a distance portion and a reading portion; a bridge member; means for attaching said lenses to said bridge member; a nose pad; and securing means for attaching said pad to said bridge member, said securing means comprising an elastic, forked, metallic member fixed to the bridge member having a notch formed in the forked portion thereof, and a metallic shaft mounted eccentrically on said pad and rotatably mounted in said notch of said fork in a manner that the pad may be raised and lowered relative to said lens by rotating said shaft in said notch, whereby in one position of the pad the distance portion of the lens is brought into position for use, and in another position of the pad the reading portion of the lens is brought in position for use.

3. In combination in a spectacle or eyeglass structure, a pair of lenses each comprising a distance portion and a reading portion; a bridge member; means for attaching said lenses to said bridge member; a nose pad; and securing means for attaching said pad to said bridge member, said securing means comprising an elastic, forked metallic member fixed to the bridge member having a notch formed in the forked portion thereof, and a metallic shaft mounted eccentrically on said pad and rotatably mounted in said notch of said fork in a manner that the lens may be raised and lowered relative to said pad, and means on said notch for cooperating with means on said metallic shaft for releasably securing said pad in a raised position.

4. In combination in a spectacle or eyeglass structure, a pair of lenses each comprising a distance portion and a reading portion; a bridge member; means for attaching said lenses to said bridge member; a nose pad; and securing means for attaching said pad to said bridge member, said securing means comprising an elastic, forked metallic member fixed to the bridge member having a notch formed in the forked portion thereof, and a metallic shaft mounted eccentrically on said pad and rotatably mounted in said notch of said fork in a manner that the lens may be raised and lowered relative to said pad, and means on said notch for cooperating with means on said metallic shaft for releasably securing said pad in a lowered position.

5. In combination in a spectacle or eyeglass structure, a pair of lenses each comprising a distance portion and a reading portion; a bridge member; means for attaching said lenses to said bridge member; a nose pad; and securing means for attaching said pad to said bridge member, said securing means comprising an elastic, forked metallic member fixed to the bridge member having an elliptical notch formed in the forked portion thereof, and a metallic shaft of elliptical cross-section mounted eccentrically in said elliptical notch of said fork in a manner that the lens may be raised and lowered relative to said pad, and means on said elliptical notch for cooperating with means on said metallic shaft for releasably securing said pad in a raised or lowered position.

6. In combination in a spectacle or eyeglass structure, a pair of lenses each comprising a distance portion and a reading portion; a bridge member; means for attaching said lenses to said bridge member; a nose pad; and securing means for attaching said pad to said bridge member, said securing means comprising an elastic, slotted member fixed to the bridge member having a notch formed in the slotted portion thereof, and a shaft mounted eccentrically on said pad and rotatably mounted in said notch of said slot in a manner that the lens may be raised and lowered relative to said pad, and means on said notch for cooperating with means on said shaft for releasably securing said pad in a raised or lowered position.

7. In combination in a spectacle or eyeglass structure, a pair of lenses each comprising a distance portion and a reading portion; a bridge member; means for attaching said lenses to said bridge member; a nose pad; and securing means for attaching said pad to said bridge member, said securing means comprising an elastic, slotted member fixed to the bridge member having a notch formed in the slotted portion thereof, and a shaft mounted eccentrically on said pad and rotatably mounted in said notch of said slot in a manner that the pad may be raised and lowered relative to said lens by rotating said shaft in said notch, whereby in one position of the pad the distance portion of the lens is brought into position for use, and in another position of the pad the reading portion of the lens is brought in position for use.

8. In combination in a spectacle or eyeglass structure, a pair of lenses each comprising a distance portion and a reading portion; a bridge member; means for attaching said lenses to said bridge member; a nose pad; and securing means for attaching said pad to said bridge member, said securing means comprising an elastic, slotted member fixed to the bridge member having a notch formed in the slotted portion thereof, and a shaft mounted eccentrically on said pad and rotatably mounted in said notch of said slot in a manner that the lens may be raised and lowered relative to said pad, and means on said notch for cooperating with means on said shaft for releasably securing said pad in a raised position.

9. In combination in a spectacle or eyeglass structure, a pair of lenses each comprising a distance portion and a reading portion; a bridge member; means for attaching said lenses to said bridge member; a nose pad; and securing means for attaching said pad to said bridge member, said securing means comprising an elastic, slotted member fixed to the bridge member having a notch formed in the slotted portion thereof, and a shaft mounted eccentrically on said pad and rotatably mounted in said notch of said slot in a manner that the lens may be raised and lowered relative to said pad, and means on said notch for cooperating with means on said shaft for releasably securing said pad in a lowered position.

10. In combination in a spectacle or eyeglass structure, a pair of lenses each comprising a distance portion and a reading portion; a bridge member; means for attaching said lenses to said bridge member; a nose pad; and securing means for attaching said pad to said bridge member, said securing means comprising an elastic, slotted member fixed to the bridge member having an elliptical notch formed in the slotted portion thereof, and a shaft of elliptical cross-section mounted eccentrically in said elliptical notch of said slot in a manner that the lens may be raised and lowered relative to said pad, and means on said elliptical notch for cooperating with means on said shaft for releasably securing said pad in a raised or lowered position.

LOUIS J. PAGE.